No. 770,202. Patented September 13, 1904.

UNITED STATES PATENT OFFICE.

CARL HERMANN VOIGT, OF LEIPZIG-PLAGWITZ, GERMANY, ASSIGNOR TO LOUISE VOIGT, OF LEIPZIG-PLAGWITZ, GERMANY.

PRODUCTION OF BINDING MEDIUMS FOR COLORS.

SPECIFICATION forming part of Letters Patent No. 770,202, dated September 13, 1904.

Application filed September 2, 1902. Serial No. 121,885. (No specimens.)

*To all whom it may concern:*

Be it known that I, CARL HERMANN VOIGT, a subject of the Emperor of Germany, residing at 31$^b$ Zschoscherschestrasse, Leipzig-Plagwitz, Germany, have invented certain new and useful Improvements in the Production of a Binding Medium for Colors to be Laid on Paper; and I do hereby declare the following to be a full, clear, and exact description of the invention, such as will enable others skilled in the art to which it appertains to make and use the same.

This invention relates to improvements in the production of substances for coloring paper, cardboard, and pasteboard to be employed in printing and stamping.

These improvements consist in replacing animal glue and all other hitherto-known binding media for coloring materials by a binding medium which is produced by treating one hundred parts of starch obtained from any source, with or without an addition of mucilage, and three hundred to five hundred parts of water with from four to six per cent., by weight, of a mixture of any kind of superoxid compound and alkaline sulfate, or instead of mixing the superoxid and the alkaline sulfate before adding to the starch they might be added separately, and in this instance I would proceed by first heating the starch, together with the alkaline sulfate, to which small quantities of free alkali have been previously added under pressure and at a temperature of 100° to 200° Celsius until the whole mass has become a clear solution. A quantity of superoxid of barium or strontium chemically equivalent to the alkali sulfate employed is then added. The alkali sulfate and the barium or strontium superoxid are hereby decomposed, sulfate of barium or sulfate of strontium being formed on the one hand and peroxid of the alkali on the other hand. The last two substances being set free in the nascent state act on the mass so as to impart thereto the very highest degree of plasticity and binding capacity, surpassing those of the best animal glue. As glazing medium (friction medium) the substances hitherto in general use may be employed, such as soap, wax, stearin, paraffin, or the like.

For the production of the coloring material the usual colors are employed, so much of the above-mentioned binding medium being added as is sufficient to produce the desired glutinous consistency.

As regards the alkaline sulfate employed, any preferred sulfate of the alkaline group—for instance, soda or potash or a mixture of same—may be used.

The coloring material for paper, cardboard, and pasteboard produced with this binding material shortens the work, as the so-called "preliminary sizing" is omitted. The material has the property of absorbing chromolithographic printing considerably quicker, so that colored printings can be effected on the same sheet consecutively and in close succession, whereas by the methods hitherto employed only one or, at the most, two colored printings can be effected in one day on the same sheet.

I claim—

1. The herein-described method of producing a binding material as a substitute for animal glue to be used in connection with coloring material for pasteboard, cardboard and paper, consisting in heating one hundred parts of starch obtained from any source, and to which has been added four to six per cent. of a mixture of a superoxid compound and alkaline sulfate and three hundred to five hundred parts of water, under pressure at 100° to 200° Celsius.

2. The herein-described method of producing a binding material as a substitute for animal glue to be used in connection with coloring material for pasteboard, cardboard and paper consisting in heating one hundred parts of starch to which has been added mucilage and three hundred to five hundred parts of water and from four to six per cent. of a mixture of superoxid compound and alkaline sulfate, under pressure at 100° to 200° Celsius.

In testimony whereof I have affixed my signature in presence of two witnesses.

CARL HERMANN VOIGT.

Witnesses:
  HERM. SACH,
  B. H. WARNER, Jr.